US008189306B2

(12) United States Patent
Jacobson et al.

(10) Patent No.: US 8,189,306 B2
(45) Date of Patent: May 29, 2012

(54) DYNAMIC GROUNDING SYSTEM AND METHOD

(75) Inventors: Boris Jacobson, Westford, MA (US); John Walker, Bolton, MA (US)

(73) Assignee: Raytheon Company, Waltham, MA (US)

(*) Notice: Subject to any disclaimer, the term of this patent is extended or adjusted under 35 U.S.C. 154(b) by 449 days.

(21) Appl. No.: 12/381,557

(22) Filed: Mar. 13, 2009

(65) Prior Publication Data

US 2010/0231284 A1 Sep. 16, 2010

(51) Int. Cl.
*H02H 3/16* (2006.01)
(52) U.S. Cl. ............................................ 361/42; 361/44
(58) Field of Classification Search ............... 361/42, 361/44; 330/202, 207, 298
See application file for complete search history.

(56) References Cited

U.S. PATENT DOCUMENTS

| | | | |
|---|---|---|---|
| 4,884,034 A | 11/1989 | Guzman | |
| 5,543,760 A * | 8/1996 | Honda et al. | 330/298 |
| 5,847,610 A * | 12/1998 | Fujita | 330/298 |
| 6,101,073 A | 8/2000 | Takehara | |
| 6,927,955 B2 | 8/2005 | Suzui et al. | |
| 7,701,287 B2 * | 4/2010 | Cheng et al. | 330/251 |
| 2002/0075072 A1 * | 6/2002 | Ishida | 330/251 |
| 2005/0093622 A1 * | 5/2005 | Lee | 330/10 |

OTHER PUBLICATIONS

IEEE Recommended Practice for Grounding of Industrial and Commercial Power Systems, IEEE Std. 142-1991, Sponsor: Power Systems Engineering Committee of the IEEE Industry Applications Society, Approved Jun. 27, 1991, IEEE Standards Board, Approved Dec. 9, 1991, American National Standards Institute, 16 unnumbered pages including Title page, Foreward, Table of Contents), and including numbered pp. 19-234.
IEEE Recommended Practice for Protection and Coordination of Industrial and Commercial Power Systems, IEEE Std. 242-1986, Sponsor: Industrial and Commercial Power Systems Committee of the IEEE Industry Applications Society, Approved Sep. 19, 1985, Reaffirmed Jun. 27, 1991, IEEE Standards Board, Approved Feb. 28, 1986, Reaffirmed Dec. 9, 1991, American National Standards Institute, 8 unnumbered pages including Title page, Foreward; Table of Contents numbered ix-xii, and pp. 1-465.
Karlsson et al., "Fault Detection and Clearance in DC Distributed Power Systems", NORPIE 2002, Nordic Workshop on Power and Industrial Electronics, Aug. 12-14, 2002, 6 pages unnumbered.
Das et al., "Grounding of AC and DC Low-Voltage and Medium-Voltage Drive Systems", IEEE Transactions on Industry Applications, vol. 34, No. 1, Jan./Feb. 1998, pp. 205-216.

* cited by examiner

*Primary Examiner* — Danny Nguyen
(74) *Attorney, Agent, or Firm* — Daly, Crowley, Mofford & Durkee, LLP

(57) ABSTRACT

Dynamic grounding including monitoring the floating DC outputs of a power amplifier, detecting an imbalance in the floating DC outputs, generating a compensation signal in response to a detected imbalance, and adjusting the power amplifier to re-balance the floating DC outputs and suppress transients.

29 Claims, 16 Drawing Sheets

DYNAMIC GROUNDING SYSTEM AND METHOD

GOVERNMENT RIGHTS

This application was made with U.S. Government support under Contract No. N00024-05-C-5346 by the Naval Seal Systems Command. The Government may have certain rights under the subject invention.

FIELD OF THE INVENTION

This invention relates to a dynamic grounding system and method.

BACKGROUND OF THE INVENTION

Grounding of an electrical power system affects such major aspects of its operation as personnel and equipment safety, magnitude of ground fault currents, overvoltages with respect to ground, ground fault detection and isolation, and transient characteristics under ground faults. Typical applications include e.g. subway trains, locomotive distribution, hybrid vehicles, and ships. Grounding methods include an ungrounded system, a solidly grounded system, a low resistance grounded system, a reactance grounded system, and a high resistance grounded system.

Grounding systems have to maintain voltage balance with respect to ground without creating excessive power dissipation in the grounding components, ensure suppression of voltage transients resulting from ground fault and common-mode voltage spikes, and keep currents circulating in the system at a minimum. None of the known grounding methods satisfy often conflicting demands facing electrical systems, particularly such systems that comprise both AC and DC voltage distributions.

The only connection from conductors to ground in an ungrounded system takes place through total system parasitic capacitance to ground. The main advantage of ungrounded systems is their ability to operate through a single conductor to ground fault. Because ground fault current is minimal, another advantage of these systems is that little or no damage occurs at the point of failure. However, high impedance to ground turns into a disadvantage during intermittent ground faults that produce under-damped oscillatory overvoltages with respect to ground and may cause insulation damage or breakdown. In the case of a DC system, the slightest unbalance in leakage currents from individual conductors will result in a voltage unbalance between individual conductor-to-bus voltages.

A solidly grounded system connects the neutral point of the source to ground. Because fault current is limited only by the source and ground impedances, a single ground fault may result in significant damage at the point of failure. The fault current may also generate hazardous voltage at the point of failure and at any point in the ground return path.

In low resistance grounding systems the source neutral is connected to ground through a resistor sized to limit the ground fault current to approximately full load current. Although such systems limit transient overvoltages and damp oscillations, they do not allow operating under ground fault conditions for long periods of time.

A reactance-grounded system connects a reactance between the system neutral and ground. This method is employed for neutral-grounded generators that are grounded through a low-value reactor to keep the ground-fault current below the three-phase fault current of the generator.

A high resistance-grounded system connects the neutral point of the source to ground through a resistor. In a high resistance grounding system, a purposely inserted grounding resistance would limit the ground fault current such that the current can flow for an extended period of time without exacerbating damage. The grounding resistor reduces fault currents to a safe level and eliminates potential damage and safety hazards of ungrounded systems. For some types of ground faults this approach may reduce transient overvoltage and oscillation because a grounding resistor provides damping for the equivalent system LC circuit.

SUMMARY OF THE INVENTION

This invention features a dynamic grounding system including a power amplifier responsive to a DC input and providing floating DC outputs, at least one of a current sensor/voltage sensor for monitoring the floating DC outputs, and a controller responsive to the at least one sensor for detecting an imbalance in the DC outputs and driving the power amplifier to re-balance the floating DC outputs and suppress transients.

In preferred embodiments the power amplifier may receive DC input. The power amplifier may receive a DC input with superimposed AC. There may be both a current sensor and a voltage sensor and the controller may include a feedback signal selector for selecting the output of one of the sensors at a time. The controller may include an error amplifier for detecting an imbalance on the floating DC outputs. The controller may include a switching function generator responsive to the error amplifier to generate pulses whose width is proportional to the imbalance. The controller may include a gate driver circuit for driving the power amplifier to rebalance the floating DC outputs. The power amplifier may include at least a first bridge circuit leg connected across the floating DC outputs. The first bridge circuit leg may include first and second switch circuits connected between the floating DC outputs and a first impedance circuit connected from the interconnection of the first and second switch circuits to ground. The first impedance circuit may include a resistance. The first impedance circuit may include a resistance and inductance. The ground may be chassis ground. The power amplifier may include a second bridge circuit leg connected across the floating DC outputs. The second bridge circuit leg may include third and fourth switch circuits connected between the floating DC outputs and a second impedance circuit connected from the interconnection of the third and fourth switch circuits to ground. The second impedance circuit may include a resistance. The second impedance circuit may include a resistance and inductance. The ground may be chassis ground. The controller may include a gate driver circuit for driving the power amplifier to rebalance the DC outputs; the power amplifier may include at least a first bridge circuit leg; the first bridge circuit leg may include first and second switch circuits connected between the floating DC outputs and a first impedance circuit connected from the interconnection of the first and second switch circuits to ground; and the gate driver circuit may provide a first pair of gating signals to alternately operate the first and second switch circuits. The controller may include a gate driver circuit for driving the power amplifier to rebalance the DC outputs; the power amplifier may include a second bridge circuit leg, the second bridge circuit leg may include third and fourth switch circuits connected between the floating DC outputs and a second impedance circuit connected from the interconnection of the third and fourth switch circuits to ground and the gate driver may provide a second pair of gating signals to alternately operate the third and fourth switch circuits interleaved with the first and second switch circuits. The switching function generator may include a PWM generator circuit. The switching function generator may include a phase shift control circuit. The switching function generator may include a frequency modulated control circuit. The switching function generator may include a bang-bang control circuit.

This invention also features a dynamic grounding system having a power amplifier responsive to a DC input and providing floating DC outputs. There is at least one of a current sensor/voltage sensor for monitoring the floating DC outputs. A controller is responsive to the at least one sensor for detecting an imbalance in the DC outputs and driving the power amplifier to re-balance the floating DC outputs and suppress transients. The controller includes an error amplifier for detecting an imbalance on the floating DC outputs; a switching function generator responsive to the error amplifier to generate pulses whose width is proportional to the imbalance; and a gate driver circuit for driving the power amplifier to rebalance the floating DC outputs.

This invention also features a dynamic grounding method including monitoring the floating DC outputs of a power amplifier, detecting an imbalance in the floating DC outputs, generating a compensation signal in response to a detected imbalance, and adjusting the power amplifier to re-balance the floating DC outputs and suppress transients.

In preferred embodiments the monitoring may include sensing at least one of the current and voltage of the floating DC outputs. Detecting may include comparing the sensed current/voltage to a reference to identify an imbalance error. Generating a compensation signal may include generating a switching function to generate imbalance adjustment signals. Adjusting the power amplifier may include applying the switching function to compensate for the imbalance in the floating DC outputs.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
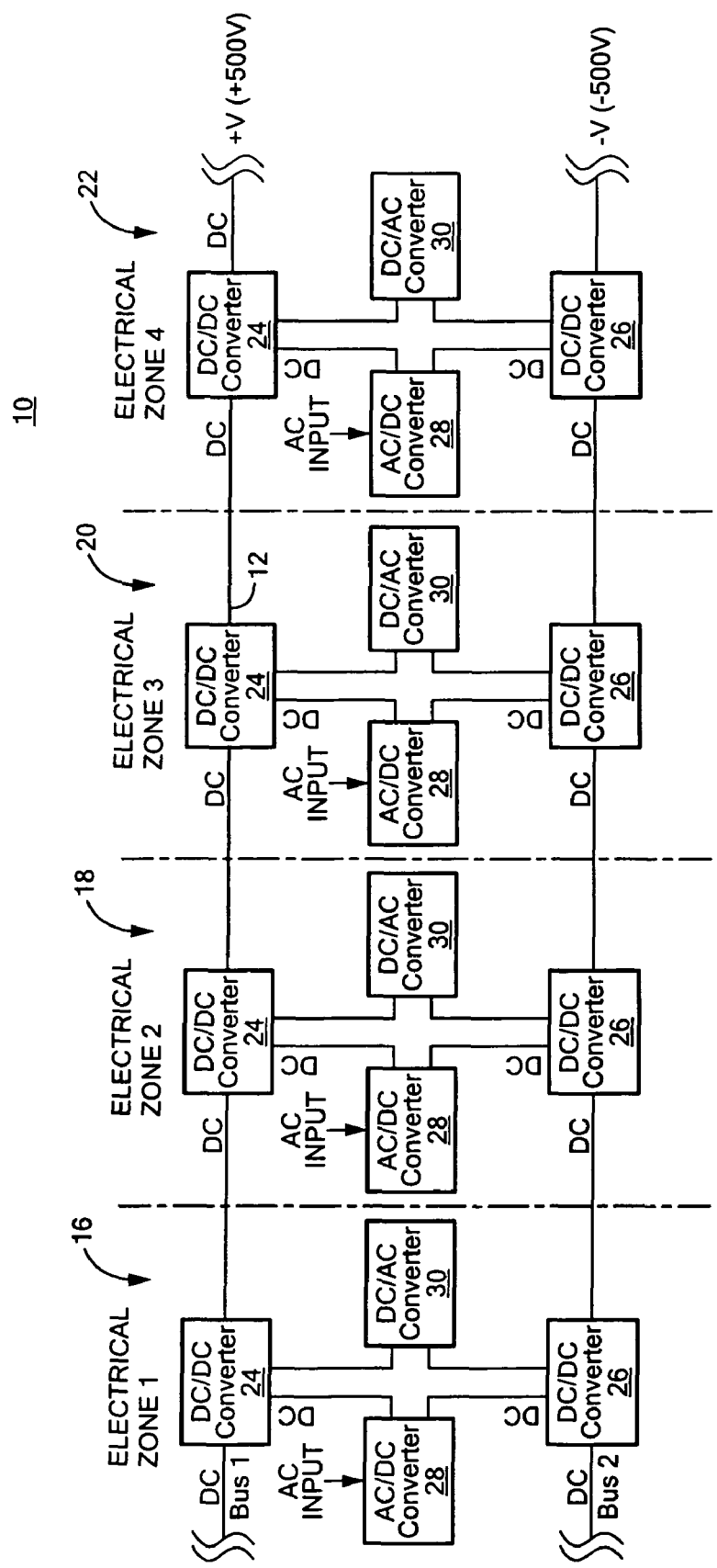
FIG. 1 is a schematic block diagram of an electrical power system with separately derived subsystems.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
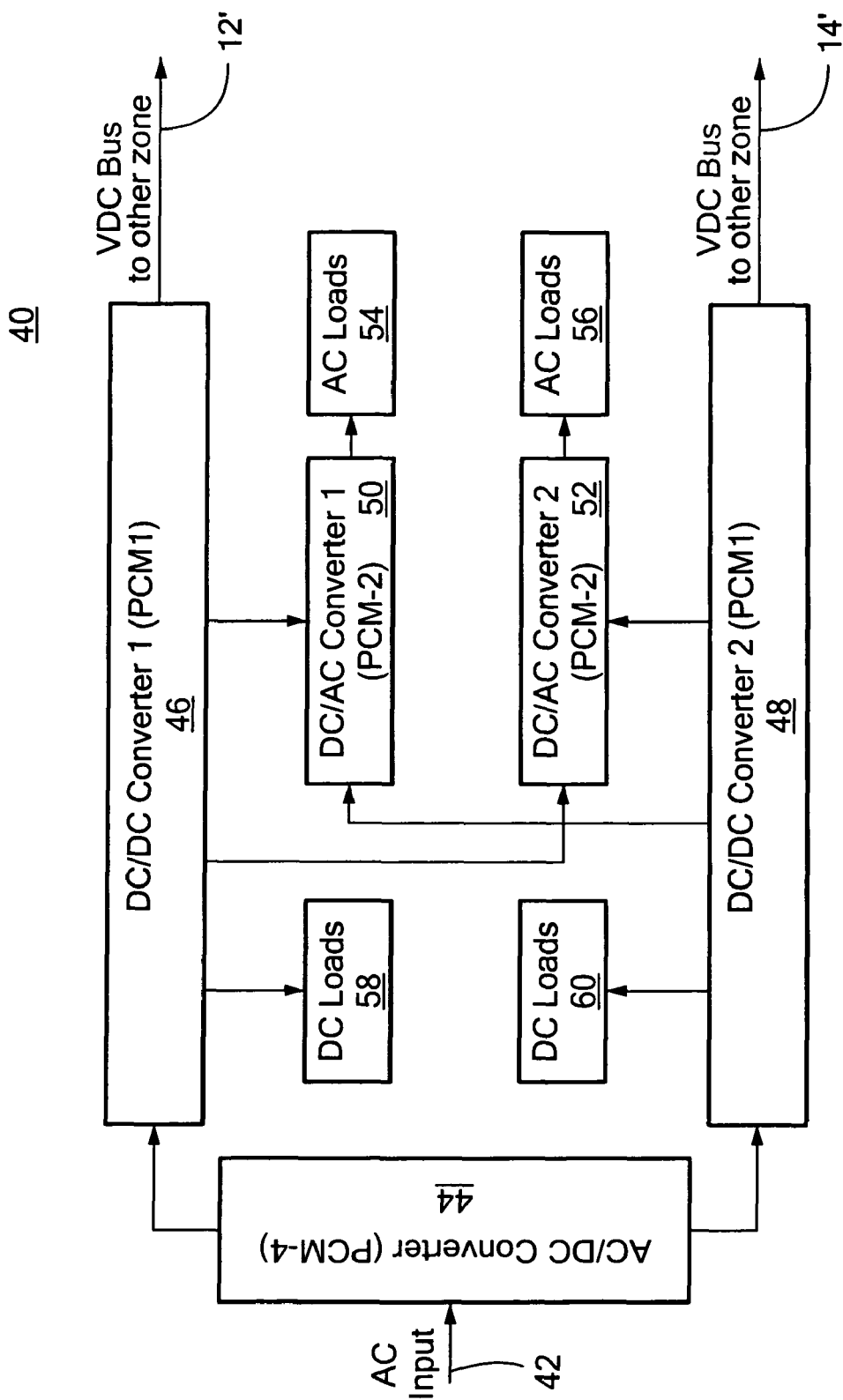
FIG. 2 is a schematic block diagram of an electrical power system with zonal distribution and AC and DC sections.

There is shown in FIG. 1 a block diagram of an electrical power system 10 with separately derived subsystems comprising both AC and DC distributions. System 10 has two independent 1,000 volt DC buses, DC bus one, 12 and DC bus two, 14. Typically DC bus 12 would be one polarity, for example, positive or +500 volts and DC bus 14 would be the opposite polarity, negative or −500 volts. Buses 12 and 14 feed four electrical zones, zone one 16, zone two 18, zone three 20, and zone four 22. Each zone includes a DC to DC converter 24 and 26, in each bus, AC to DC converter 28, which receives the AC input, and a DC to AC converter 30 which provides AC output. While the zones 16-22 are not galvanically isolated from each other, AC/DC converters 28 provide galvanic isolation for each zone from the AC source and generate DC voltages. A power distribution circuit 40 having but one zone is shown in FIG. 2, the AC input 42 is fed into an AC/DC converter 44 which may be an isolated AC/DC power conversion module type 4, or PCM-4 that generates DC voltage feeding two DC/DC converters non-isolated (power conversion modules type 1 or PCM-1 46 and 48. Each DC to DC converter 46 and 48 converts its input voltage into another voltage and feeds DC loads and DC/AC converters 50, 52 which may be non-isolated power conversion modules type 2 or PCM-2. DC to AC converters generate AC voltages for AC loads, 54, 56, while DC loads 58, and 60 are fed from DC/DC converters 46, and 48.

Figure 3:
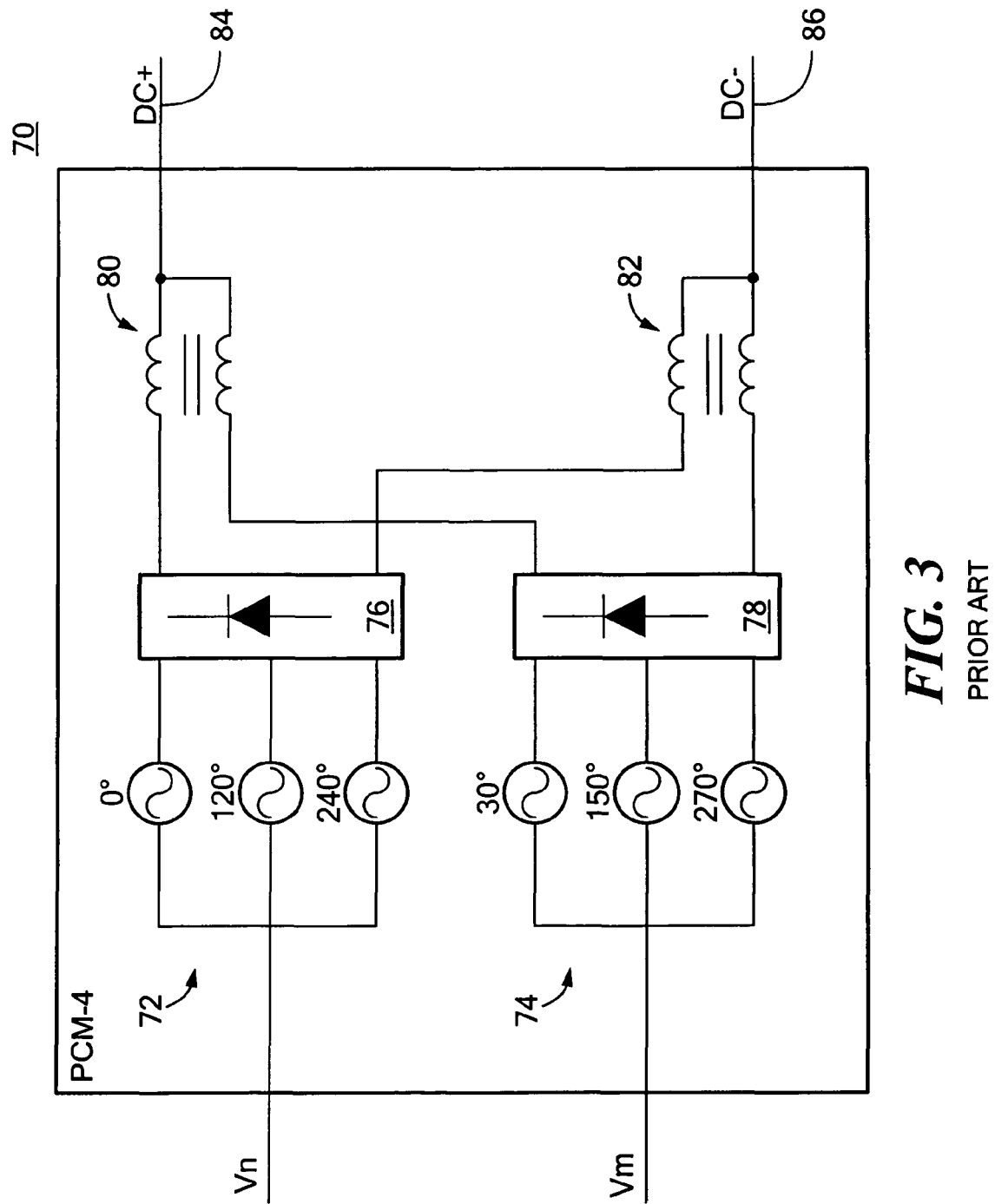
FIG. 3 is a schematic block diagram of AC/DC converters using a 12-pulse rectifier.
Figure 4:
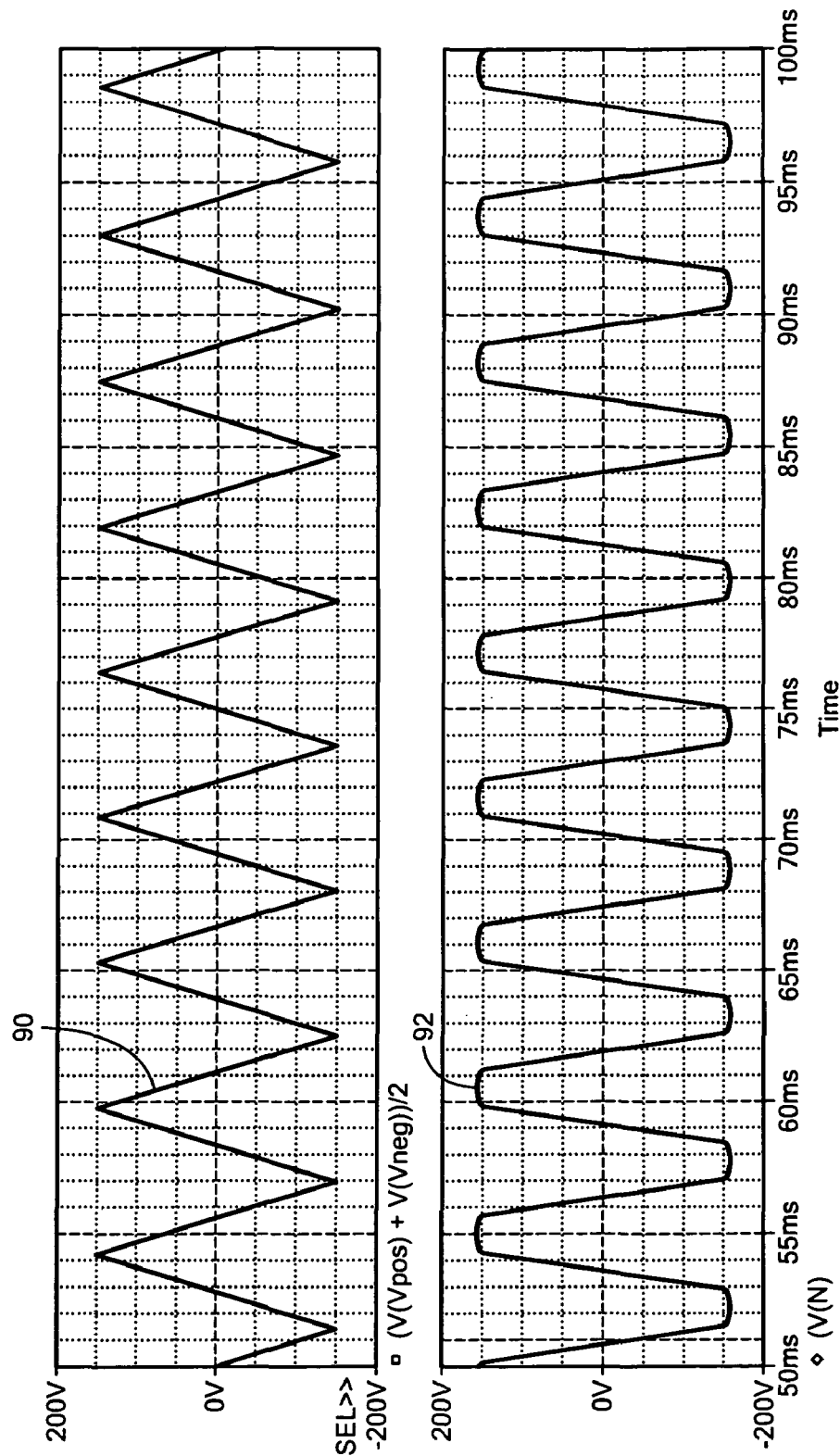
FIG. 4 shows waveforms of the DC bus and ungrounded neutral voltages.

Conventionally when resistance grounding is used, common practice requires that each separately derived subsystem should be grounded at one point only as close to the source as possible, for an AC system this would normally be at the neutral (actual or derived) of the approximate secondary winding of an isolation transformer. Each power conversion module type 4 represents a separately derived subsystem which receives AC power and converts it to DC power for further distribution. A natural choice for the grounding point therefore would be the neutral of the transformer secondary or secondaries supplying this AC to DC conversion equipment. The presence of a DC output bus, however, provides an opportunity to consider an alternative grounding methodology. A simplified diagram of an AC to DC converter 70, FIG. 3, uses two separate and isolated secondary windings 72, 74 feeding two full wave 6-pulse rectifiers 76, 78 whose outputs are combined through interphase transformers 80, 82 to create a DC bus 84, 86. In this particular prior art example there are only two symmetrical grounding options. One is AC grounding at nodes $V_n$, and/or $V_m$, the other is DC grounding by way of a derived mid-point of the DC output bus. If node $V_n$ or $V_m$ is grounded then there exists a common mode voltage on the DC bus of approximate amplitude equal to 40% of the AC line voltage. This voltage is almost triangular in shape at a frequency of three times the line frequency. A voltage of similar amplitude will appear at node $V_m$. Therefore, in order to avoid undesirable circulating currents the neutrals should be kept isolated from each other. The common mode voltages present on the DC bus are shown at 90 in FIG. 4 and the voltage on neutral $V_m$ at 92 when $V_n$ is solidly grounded. If the DC bus is grounded resistively through two equal value resistors connected to ground and neutrals $V_n$ and $V_m$ are allowed to float then there is no common mode voltage present on the DC bus but now a common-mode voltage is present at each neutral point $V_n$ and $V_m$ inside the AC/DC conversion equipment 46 and 48, FIG. 2.

Figure 5:
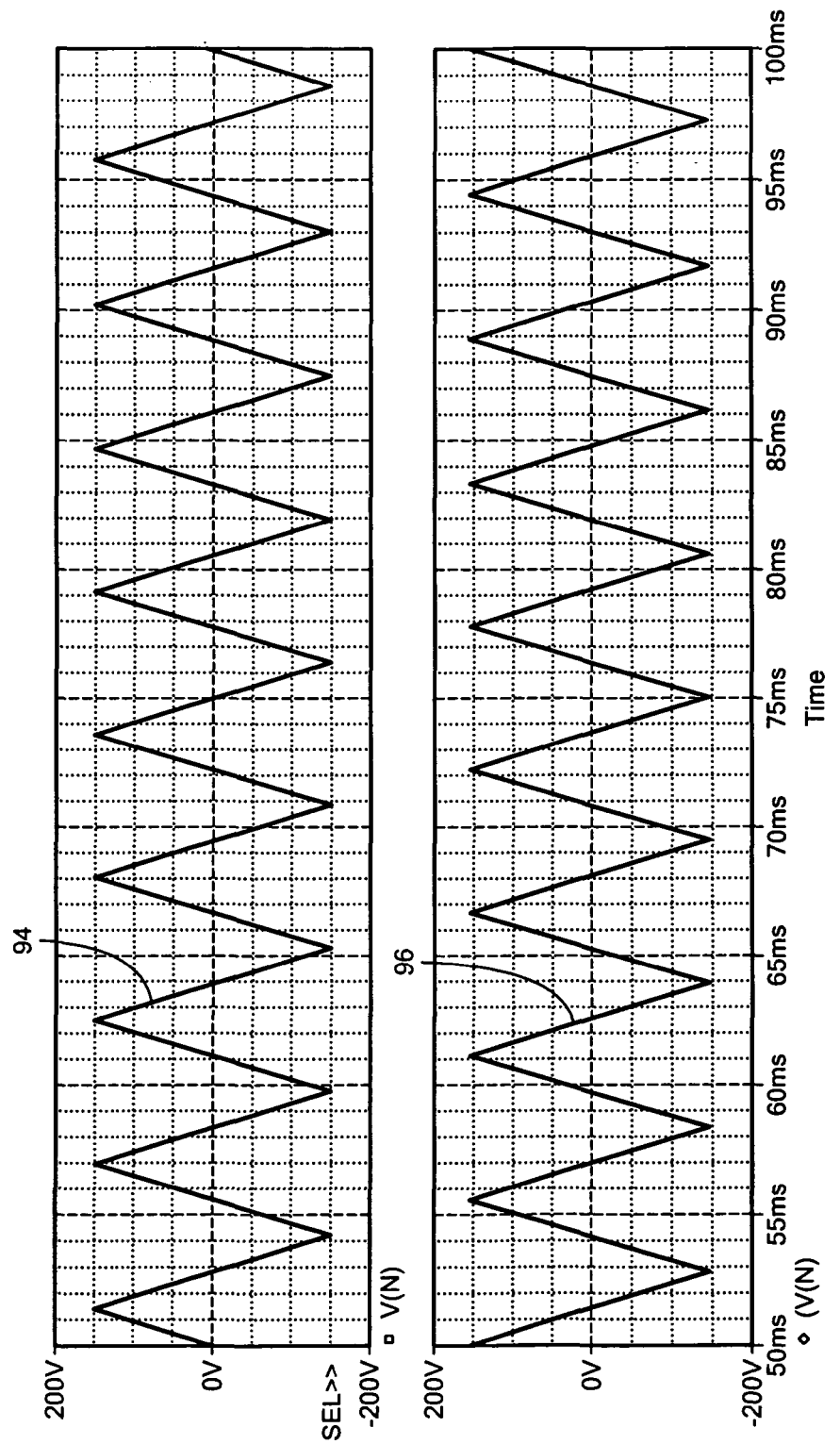
FIG. 5 shown waveforms of ungrounded neutral voltages $V_n, V_m$.

FIG. 5 shows the voltages present on neutral $V_n$ 94 and $V_m$ 96 when the DC bus, FIG. 2, is grounded. If there exists impedance both from the DC bus to ground and from any or all neutrals to ground then continuous circulating currents will be created, even under fault free conditions, which pass through the grounding structure such as the chassis of a hybrid vehicle or the hull of a ship and these will only be limited by the total effective circuit impedance. In order to minimize any potential structure currents either the DC bus should be grounded or the neutral(s) should be grounded but not both. This refers to deliberate grounding impedance rather than unavoidable parasitic impedance. Unfortunately, in any large DC power distribution system there will be unavoidable capacitance from each pole to ground that is equal to the aggregate capacitance for all loads connected to the DC bus and this has to be considered with respect to the unexpected parasitic capacitance in the AC/DC conversion equipment e.g. power conversion module type 4. See parts 46 and 48 in FIG. 2.

Figure 6:
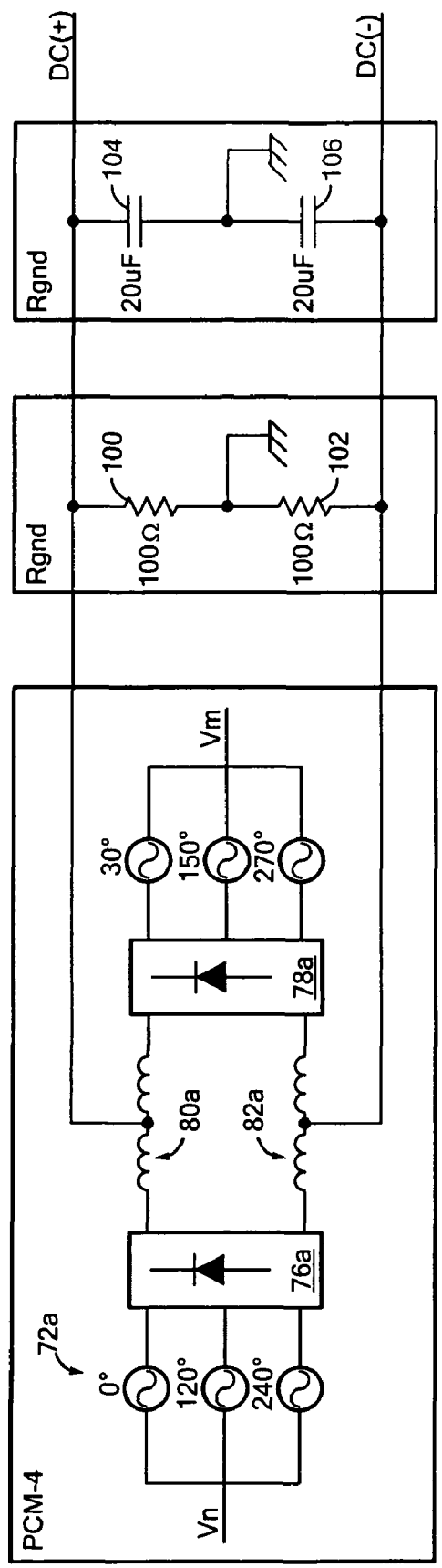
FIG. 6 is a schematic diagram of a DC ground configuration.

If the aggregate capacitance from the DC bus to ground represents the dominant or lowest impedance to ground then circulating currents are minimized by leaving neutrals unconnected. For example, a conventional 12-pulse rectifier system would require two ungrounded neutrals while a 24-pulse system would require four neutrals to be ungrounded. With only capacitance to ground from the DC bus and no intentional DC path to ground from the neutral(s) there is no DC reference point for the DC bus to establish balance. That is: +Vbus nominal equals −Vbus nominal and the presence of leakage currents can cause an unpredictable DC offset. As a minimum then, in those cases, it is desirable to establish a DC reference point and this requires that two equal resistors be connected from the positive pole and negative pole to ground. Furthermore the DC current through these resistors should be much greater than the expected DC leakage current to ground under fault free conditions. Such resistors are shown at 100 and 102 in FIG. 6 along with capacitors 104 and 106. FIG. 6 shows the aforementioned DC grounding configuration and also shows that in nominally balanced conditions there is no net circulating current between the mid-points of ground resistors 100, 102 and the mid-point of the aggregate capacitances 104, (20 microfarads from each DC bus conductor) to ground.

Figure 7:
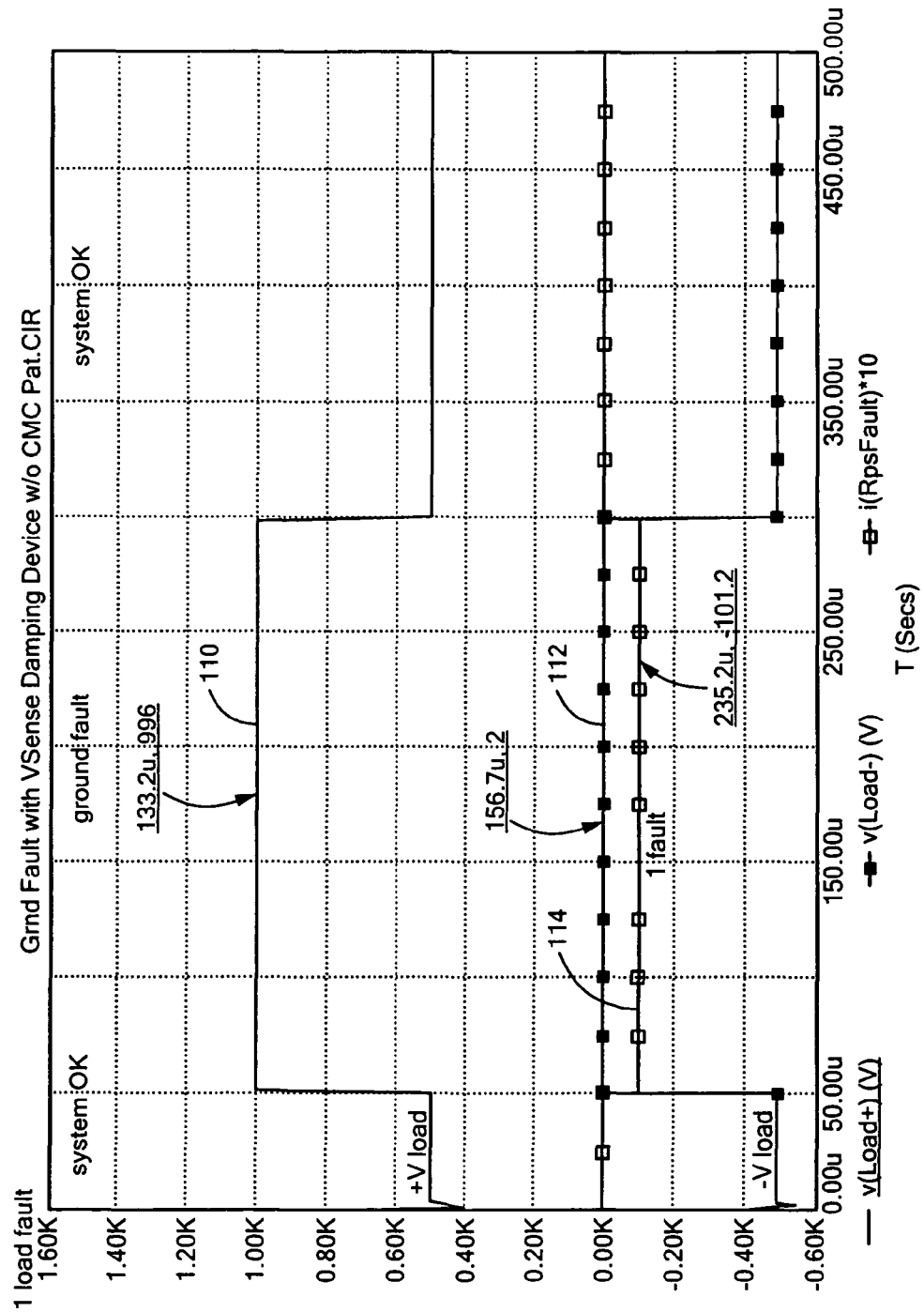
FIG. 7 shows waveforms for a ground fault at the source without bus capacitance.
Figure 8:
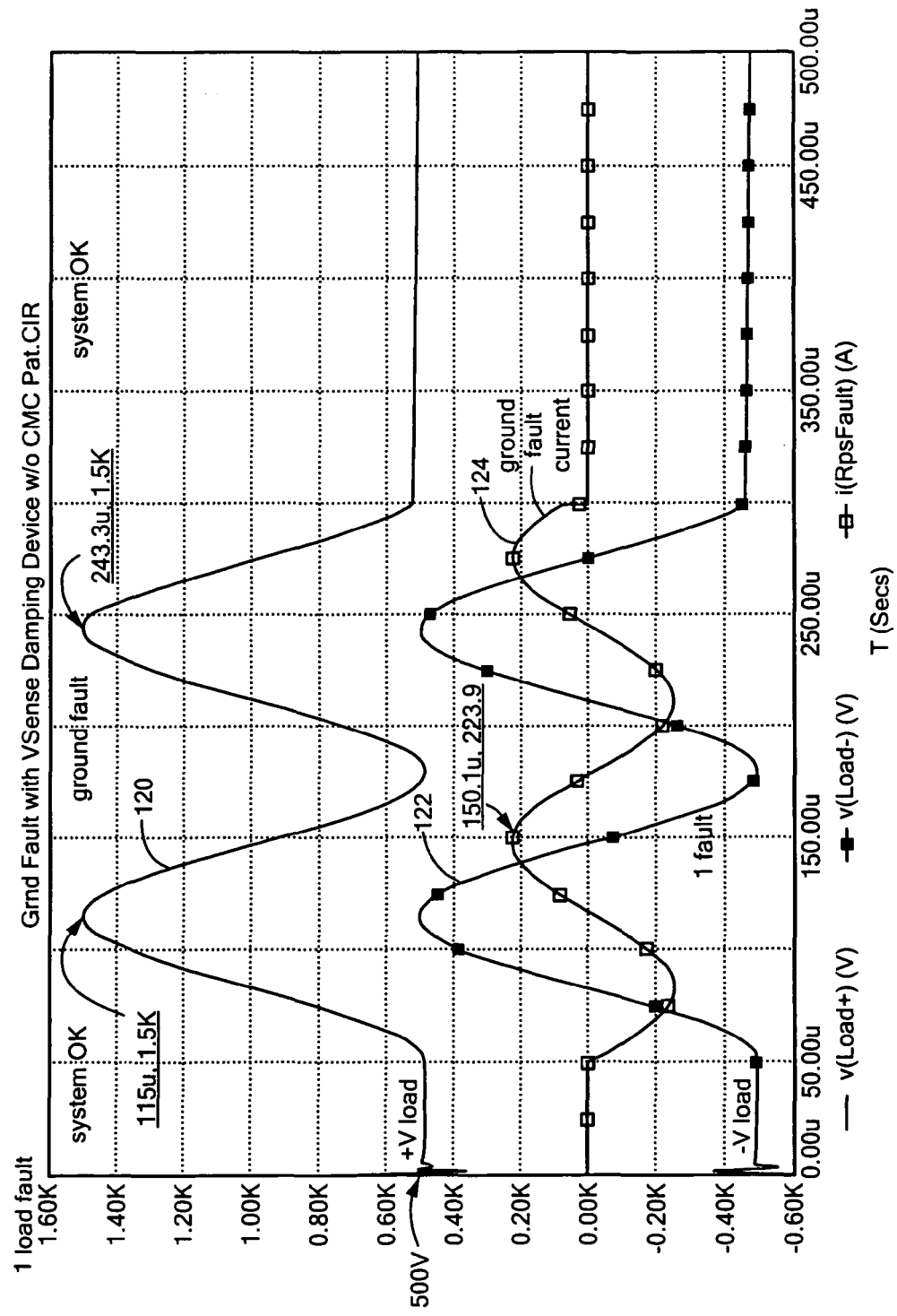
FIG. 8 shown waveforms for a ground fault at the source with 5 uf bus capacitance.

Such common-mode disturbances as ground faults and voltage surges with respect to ground cause transient excitation of both DC bus conductors with respect to ground. During these transients, the aggregate bus-to-ground ground capacitance and inductance of common-mode filters often produce under-damped oscillatory overvoltages with respect to ground that may cause insulation and equipment damage or breakdown. One commonly perceived benefit of resistance grounding is damping of oscillation produced by various ground faults. Unfortunately, the neutral grounding resistor provides damping only under certain types of ground faults and leaves the system under-damped and exposed to severe overvoltages under other ground faults. One case to be considered is a system with a ground fault at the source with no common mode bus capacitors. Waveforms in this case as shown in FIG. 7 demonstrate well damped transient processes. In FIG. 7 the +V voltage is shown at 110, while the negative voltage is shown at 112 and the fault current appears at 114. As expected, the magnitude of the steady state ground fault current is determined by the grounding resistance. The same ground fault with the common-mode bus capacitance of 5 uF results in a strong oscillatory response and a bus overvoltage of 1500V peak with respect to ground as can be seen by the shape of the positive bus voltage 120, negative bus voltage 122 and ground fault current 124 in FIG. 8.

Analysis shows that when the grounding resistor is shorted by a hard ground fault, the common-mode inductor and the common-mode bus capacitor form an under-damped series resonant circuit producing the oscillatory response. It should be noted that while the model has two grounding resistors, a single resistor connected to a center-tapped power source will produce the same transient response to a ground fault.

Figure 9:
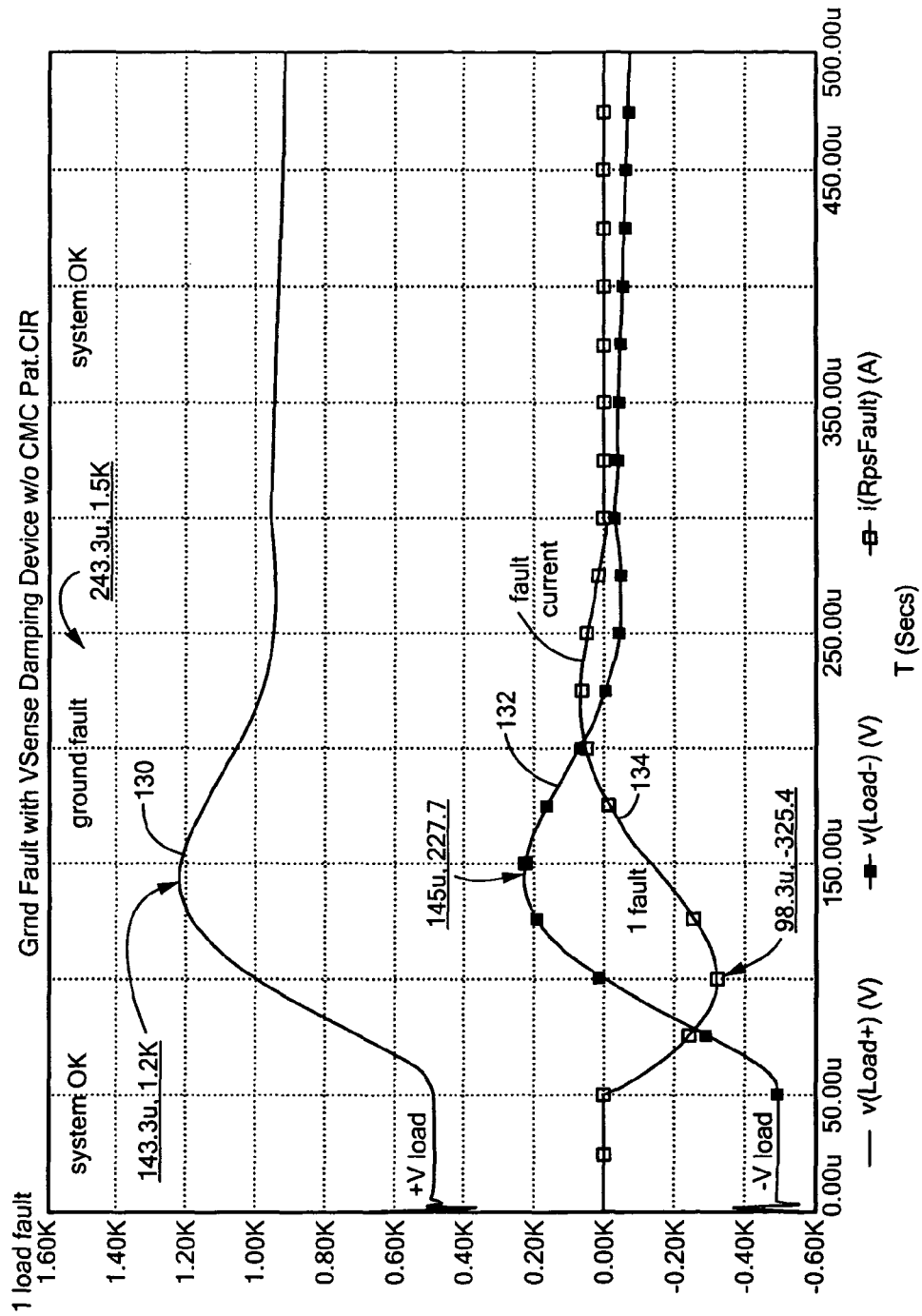
FIG. 9 shows waveforms for a grounded system source ground fault with 5 uf bus capacitance and RC damping.

A conventional method of damping the oscillatory response is to add series RC networks in parallel with both bus capacitors. The result as shown in, FIG. 9, is that a 15 uF damping capacitor and 9Ω damping resistor connected in parallel to each bus capacitor significantly improves a transient response to the source ground fault. This can be seen by the shape of the positive bus voltage 130, negative bus voltage 132, and ground fault current 134, FIG. 9. However, it should be noted that the damping capacitors increase the peak fault current. Although the damping networks reduce the system overvoltage, this solution lacks flexibility in that it cannot respond to changes in operating conditions. Thus, if a power subsystem within the zone is disconnected from the common bus, the bus capacitance will be reduced and the damping network will no longer provide the optimum suppression of overvoltages resulting from a ground fault.

In addition to problems of grounded electrical systems, the ungrounded systems have additional disadvantages caused by unbalanced leakage currents. In principle, a slight increase of leakage current from one rail will produce a drastic shift of the floating bus with respect to ground. For example, if DC resistance from one rail to ground is reduced from 10 MΩ to 1 MΩ the leakage current increases from 50 to 500 uA that may still be within the system requirements. However, the rail with the lower resistance and higher current will drift to Vlow− 1000V*1 MΩ/(1 MΩ+10 MΩ)=91 VDC from ground while the other rail will settle to Vhigh=1000V*10 MΩ/(1 MΩ+10 MΩ)=909 VDC from ground.

As indicated previously, one disadvantage of the prior art low resistance grounded systems is high peak current flowing through equipment in the event of a ground fault. If two grounding resistors are used instead of a single neutral grounding resistor, excessive power dissipation in these resistors under normal conditions may be added to deficiencies of this grounding method.

Figure 10:
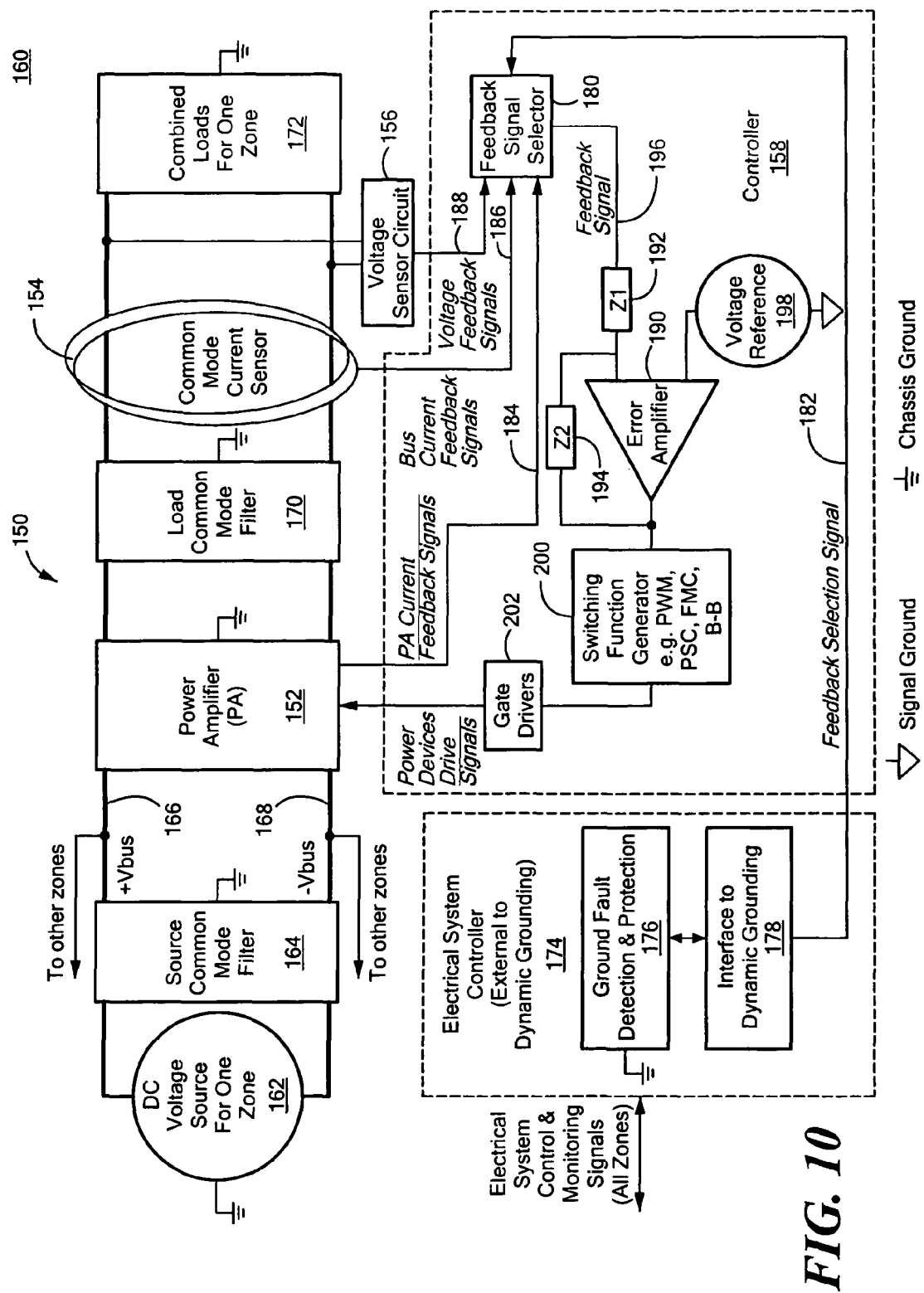
FIG. 10 is a schematic block diagram of dynamic grounding system according to this invention.

One embodiment of the dynamic grounding system 150 according to this invention is shown in FIG. 10, as including power amplifier 152, one or more sensors such as common mode current sensor 154 and voltage sensor circuit 156 and a controller 158. The rest of the electrical system 160 as shown in FIG. 10 includes a DC voltage source, for one zone 162 which feeds, for example, a source common mode filter 164 which submits the floating DC bus, +V bus, 166 and −Vbus 168 to power amplifier 152. System 160 may also include load common mode filter 170 and combined loads for the one zone 172. There is shown an electric system controller 174 which may be external to the dynamic grounding system 150. It processes electrical system control and monitoring signals from all zones and includes a ground fault detection and protection circuit 176 as well as an interface to dynamic grounding 178. Controller 158 includes a feedback signal selector 180 which in response to the signal from interface dynamic grounding 178, the power amplifier current feedback signals on lines 182, and the power amplifier current feedback signals on line 184, selects either the current sensor circuit input on line 186 or the voltage sensor circuit input on line 188. Whichever signal is selected is delivered to error amplifier 190 which has associated with it an input impedance 192 and feedback impedance 194. Error amplifier 190 detects the presence of an imbalance between floating DC buses 166 and 168 by comparing the sensor input on line 196 from feedback selector 180 with a voltage reference 198. The error signal is transmitted to switching function generator 200 which may for example be a pulse width modulation (PWM) circuit, a phase shift control (PSC) circuit, a frequency modulation control (FMC) or a hysteretic control also known as a bang-bang (B-B) circuit. Whichever means is used to generate the switching function the ultimate switching functions are delivered to gate drivers 202 which then drive the appropriate gates in power amplifier 152 to generate the compensation signals to compensate for the imbalance in the floating DC output buses 166 and 168.

Although the preferred embodiment shown in FIG. 10 has a signal dynamic grounding per zone, other configurations may use multiple dynamic grounding per zone as needed for optimal performance to the complete electrical system. If a system contains multiple dynamic grounding units, it might be beneficial to coordinate their operations through an electrical system controller. It is also noted that the proposed system uses a power amplifier that sinks as well as sources current to the bus (two quadrant operations). An implementation of the dynamic grounding for AC systems requires a four quadrant amplifier that can sink and source current from positive as well as negative voltages. While various chassis grounds shown in FIG. 10 have the same or nearly the same electrical potential, their locations may be different as defined by the system's layout.

Figure 11:
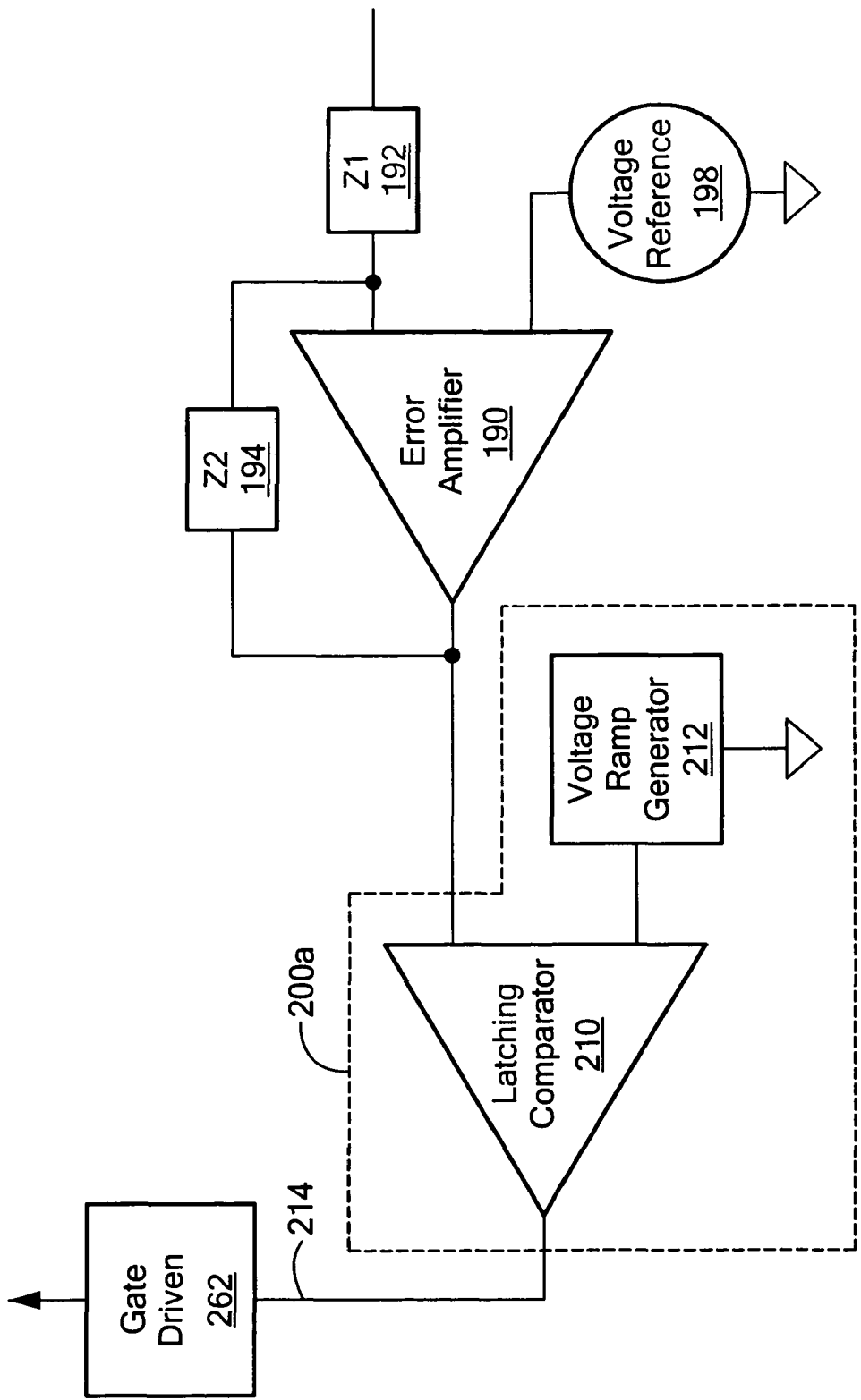
FIG. 11 is a more detailed schematic diagram of one embodiment of the switching function generator of FIG. 10, implemented with a pulse width modulator.

Switching function generator 200, FIG. 10, may be implemented as shown in FIG. 11, to operate as a pulse width modulator (PWM) circuit 200a including a latching comparator 210 and a voltage ramp generator 212. Once an error is detected by error amplifier 190 the signal is delivered to one input of latching comparator 210. When the voltage ramp generator 212 is coincident with the error signal latching comparator 210 then provides an output determined by the combination of the magnitude of the error signal and the timing of the voltage ramp to produce a pulse width modulated signal on line 214 which is delivered to gate drivers 202. Phase shift controllers, frequency modulation controllers, may be constructed in the same way. If a bang-bang controller is used the error amplifier may not be necessary.

Figure 12:
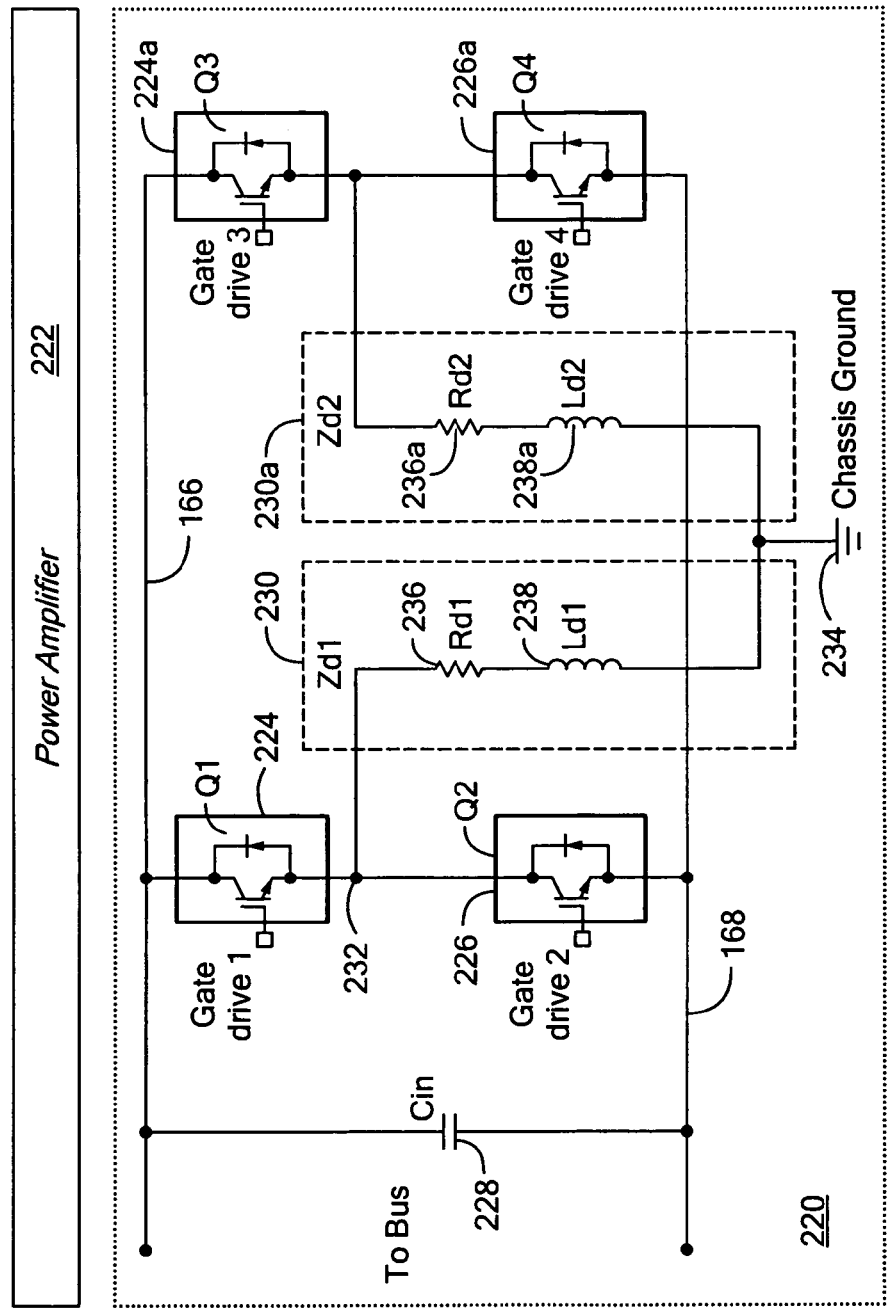
FIG. 12 is a more detailed schematic diagram of one embodiment of the power amplifier according to this invention.

Power amplifier 152 may include one or more bridge legs. The embodiment of power amplifier 152a shown in FIG. 12 includes two bridge legs 220 and 222. The first bridge leg 220 includes a first switching device 224 including semiconductor Q1 and a second switching device 226 including semiconductor Q2. The two are connected in series between floating DC buses 166 and 168, for example, which are provided with an input capacitor 228. A grounding damping impedance 230 is connected at node 232 where the two switching circuits 224, 226 are connected together. The other end of grounding impedance 230 is connected to ground 234 which is chassis ground. Grounding impedance 230 may include a resistance 236 or it may include resistance 236 and an inductance 238. Second bridge leg 222 and subsequent bridge legs may be constructed in the same fashion.

Figure 13:
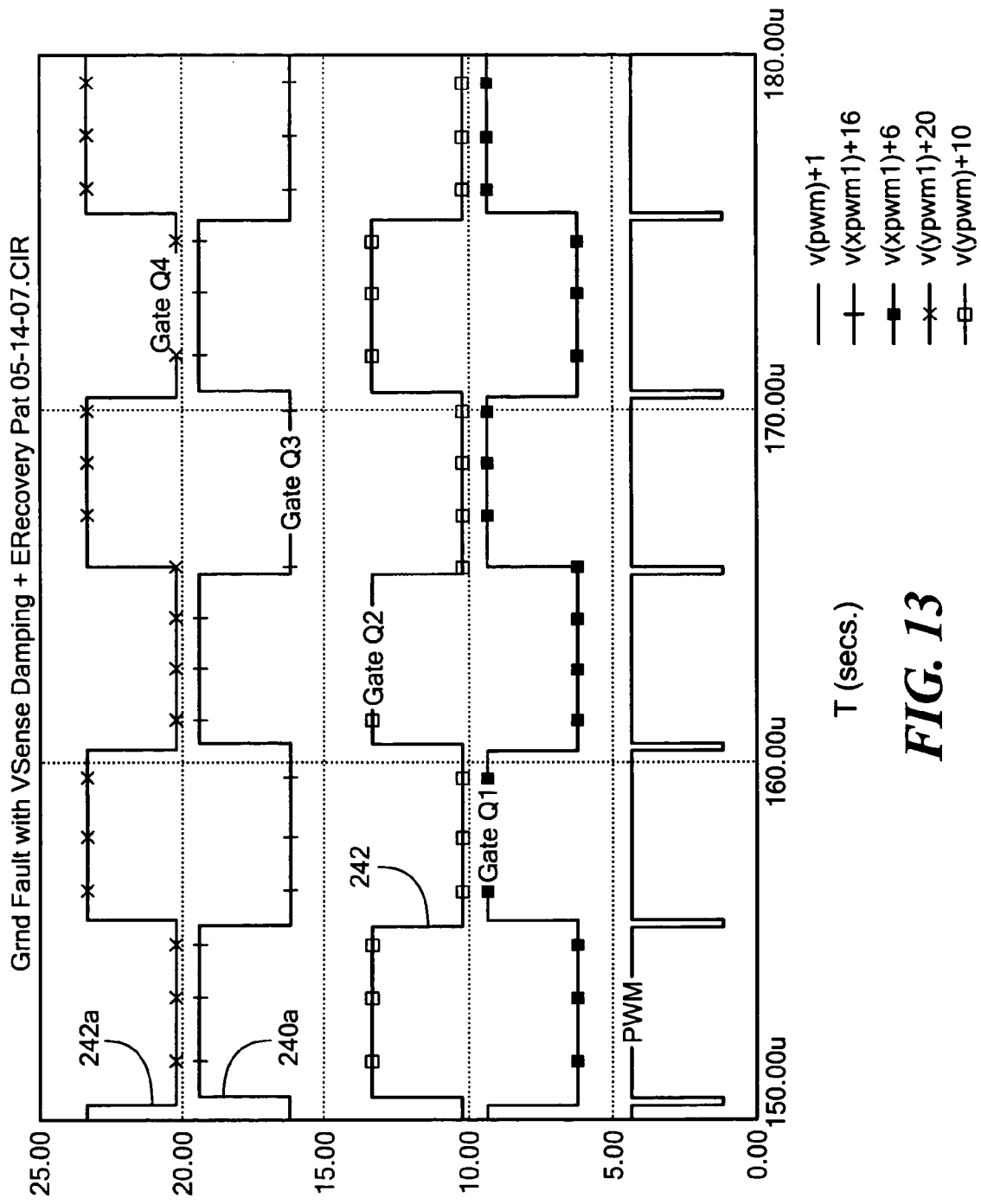
FIG. 13 illustrates waveforms of the gate driver of FIG. 10 for a two legged bridge construction.

Gate drivers 202 provide the signals for operating switches 224 and 226 in a one bridge leg device and for the additional switches 224a, 226a, 224b, 226b-224n, 226n in each case. The gating signals are shown in FIG. 13 where it can be seen that the signals to switching circuits 224 and 226 are labeled 240 and 242 and clearly illustrate that when switch 224 is closed switch 226 is open. For the second bridge, switch 224a is operated by signal 240a and switch 226a is operated by signal 242a. Here too, signals 240a, and 242a are such that when switch 224a is closed 226a is open and when 224a is open switch 226a is closed. Also note, because of the phasing of signals 240, 242, 240a, 242a, switches 224 and 226a operate in synchronism in opposite phase to signals 224a and 226. Thus when switch 224 is closed current is flowing from bus 166 through switch 224 to grounding impedance 230 and ground 234 and current is flowing from ground 234 through grounding impedance 230a and through switch 226a. In the next period current flows through switch 224a through grounding impedance 230a to ground 234 and from ground 234 through grounding impedance 230 through switch 226 to bus 168. The result of this is apparent from FIGS. 14 and 15.

Figure 14:
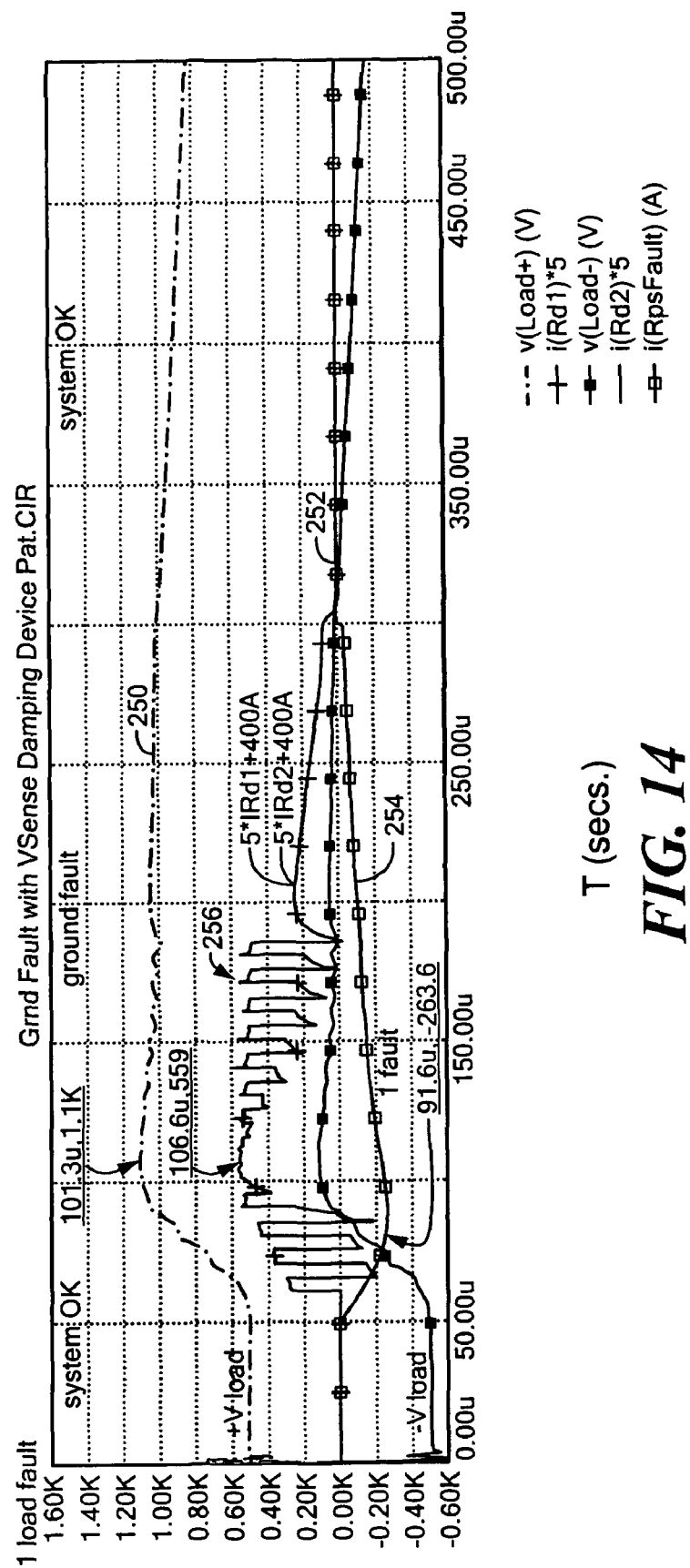
FIG. 14 illustrates waveforms for dynamic grounding with current sensing.
Figure 15:
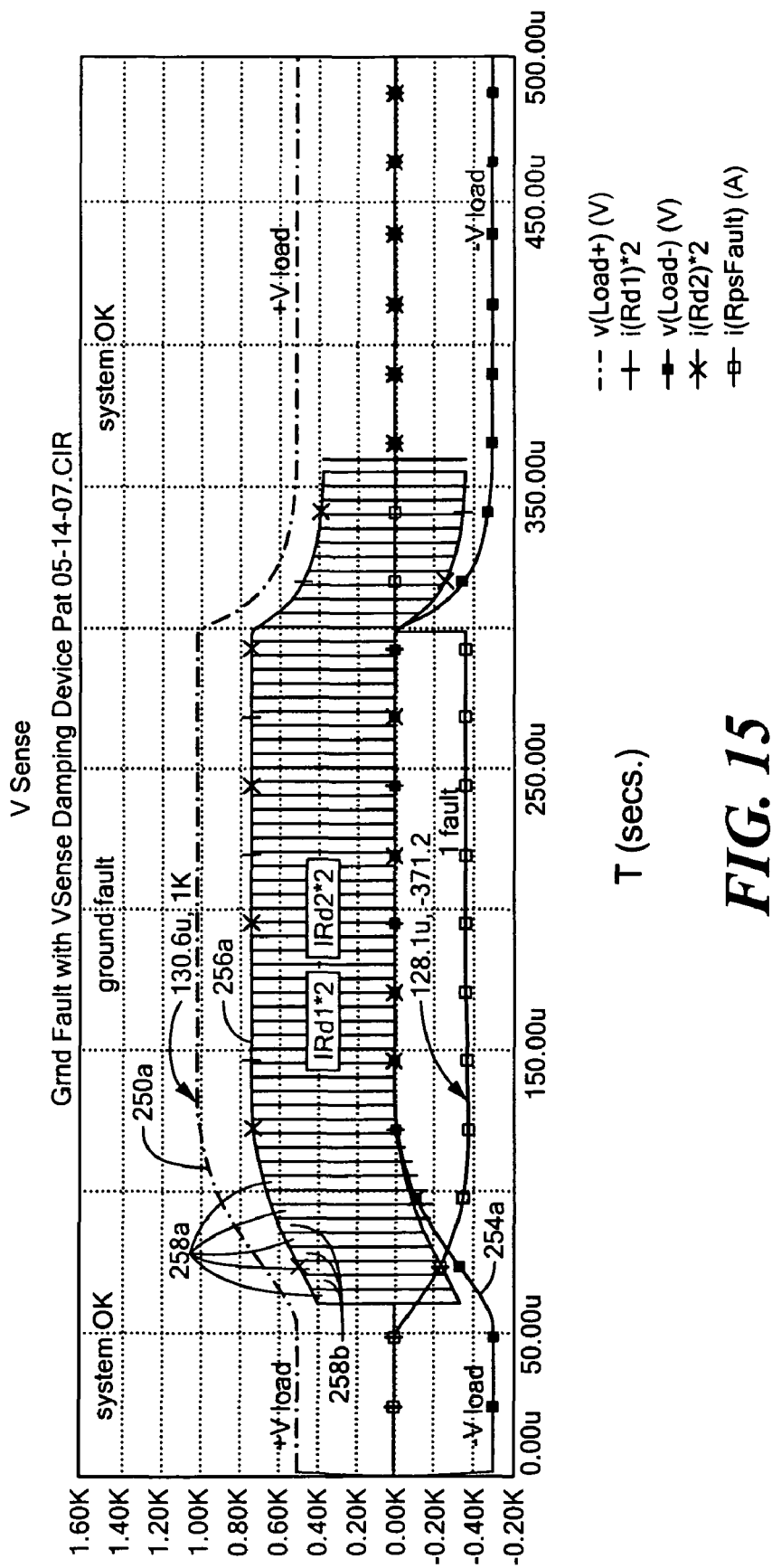
FIG. 15 illustrates waveforms for a ground fault with voltage sense damping by a two legged bridge circuit.

In FIG. 14 +V bus is shown at 250 while the voltage on −V bus is shown at 252, the ground fault current appears at 254. Only one bridge leg has been employed in generating these waveforms and thus the pulse width modulated compensation signal 256 can be seen to be a series of discrete spaced pulses. This results in an uneven or ripple envelope on the corresponding areas of waveforms 250 and 252. With two bridge legs employed as shown in FIG. 15, the pulse width modulated signals are interleaved 258a, 258b so that one set 256 occupies alternate periods while the other 256a occupies interleaved portions making a much smoother envelope on the compensation current 256a. This results in a smoother envelope for the +V bus waveform 250a and the −V bus DC waveform 254a.

Figure 16:
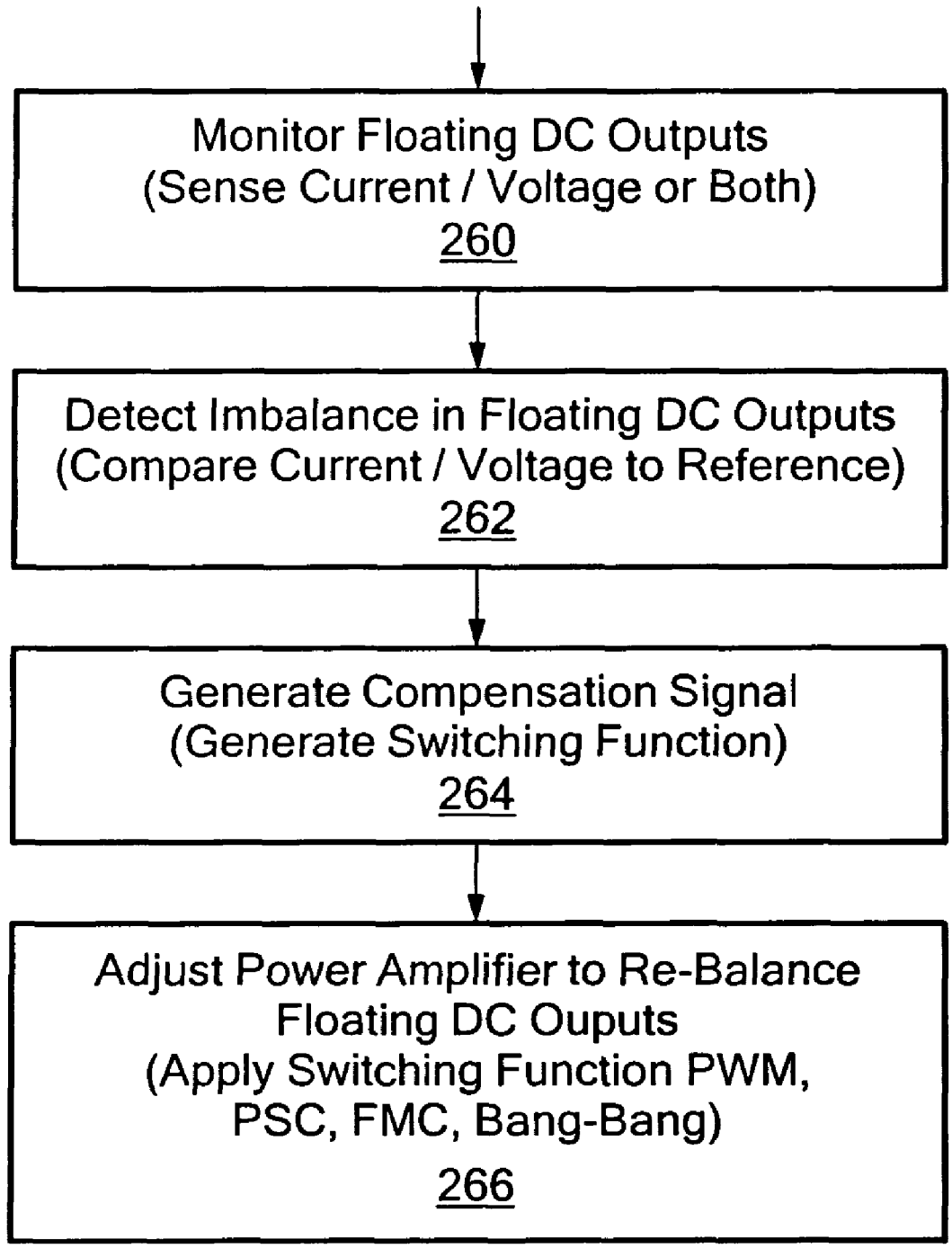
FIG. 16 is a flow chart of the method of this invention.

This invention also relates to a method of dynamic grounding as shown in FIG. 16 which involves monitoring the floating DC outputs of a power amplifier 260, for example, by sensing current and/or voltage, then detecting an imbalance in the floating DC outputs by, for example, comparing the current and/or voltage to a reference 262. A compensation signal is generated, 264, for example, by generating a switching function and the power amplifier is adjusted by that switching function 266 to rebalance the floating DC outputs. The switching function may include any one of a number of approaches: pulse width modulation, phase shift control, frequency modulation control, or bang-bang circuit.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A dynamic grounding system comprising:
    a power amplifier responsive to a DC input and providing floating DC outputs;
    at least one of a current sensor/voltage sensor for monitoring the floating DC outputs; and
    a controller responsive to said at least one sensor for detecting an imbalance in the DC outputs and driving said power amplifier to re-balance the floating DC outputs and suppress transients.

2. The dynamic grounding system of claim 1 in which said power amplifier receives DC input.

3. The dynamic grounding system of claim 1 in which said power amplifier receives a DC input with superimposed AC.

4. The dynamic grounding system of claim 1 in which there are both a current sensor and a voltage sensor and said controller includes a feedback signal selector for selecting the output of one of said sensors at a time.

5. The dynamic grounding system of claim 1 in which said controller includes an error amplifier for detecting an imbalance on said floating DC outputs.

6. The dynamic grounding system of claim 5 in which said controller includes a switching function generator responsive to said error amplifier to generate pulses whose width is proportional to said imbalance.

7. The dynamic grounding system of claim 6 in which said controller includes a gate driver circuit for driving said power amplifier to rebalance the floating DC outputs.

8. The dynamic grounding system of claim 1 in which said power amplifier includes at least a first bridge circuit leg connected across said floating DC outputs.

9. The dynamic grounding system of claim 8 in which said first bridge circuit leg includes first and second switch circuits connected between said floating DC outputs and a first impedance circuit connected from the interconnection of said first and second switch circuits to ground.

10. The dynamic grounding system of claim 9 in which said first impedance circuit includes a resistance.

11. The dynamic grounding system of claim 9 in which said first impedance circuit includes a resistance and inductance.

12. The dynamic grounding system of claim 9 in which said ground is chassis ground.

13. The dynamic grounding system of claim 8 in which said power amplifier includes a second bridge circuit leg connected across said floating DC outputs.

14. The dynamic grounding system of claim 13 in which said second bridge circuit leg includes third and fourth switch circuits connected between said floating DC outputs and a second impedance circuit connected from the interconnection of said third and fourth switch circuits to ground.

15. The dynamic grounding system of claim 13 in which said second impedance circuit includes a resistance.

16. The dynamic grounding system of claim 13 in which said second impedance circuit includes a resistance and inductance.

17. The dynamic grounding system of claim 13 in which said ground is chassis ground.

18. The dynamic grounding system of claim 1 in which said controller includes a gate driver circuit for driving said power amplifier to rebalance the DC outputs; said power amplifier includes at least a first bridge circuit leg; said first bridge circuit leg includes first and second switch circuits connected between said floating DC outputs and a first impedance circuit connected from the interconnection of said first and second switch circuits to ground; and said gate driver circuit provides a first pair of gating signals to alternately operate said first and second switch circuits.

19. The dynamic grounding system of claim 18 in which said controller includes a gate driver circuit for driving said power amplifier to rebalance the DC outputs; said power amplifier includes a second bridge circuit leg, said second bridge circuit leg includes third and fourth switch circuits connected between said floating DC outputs and a second impedance circuit connected from the interconnection of said third and fourth switch circuits to ground and said gate driver provides a second pair of gating signals to alternately operate said third and fourth switch circuits interleaved with said first and second switch circuits.

20. The dynamic grounding system of claim 6 in which said switching function generator includes a PWM generator circuit.

21. The dynamic grounding system of claim 6 in which said switching function generator includes a phase shift control circuit.

22. The dynamic grounding system of claim 6 in which said switching function generator includes a frequency modulated control circuit.

23. The dynamic grounding system of claim 6 in which said switching function generator includes a bang-bang control circuit.

24. A dynamic grounding system comprising:
    a power amplifier responsive to a DC input and providing floating DC outputs;
    at least one of a current sensor/voltage sensor for monitoring the floating DC outputs; and
    a controller responsive to said at least one sensor for detecting an imbalance in the DC outputs and driving said power amplifier to re-balance the floating DC outputs and suppress transients, said controller including, an error amplifier for detecting an imbalance on said floating DC outputs;
    a switching function generator responsive to said error amplifier to generate pulses whose width is proportional to said imbalance; and
    a gate driver circuit for driving said power amplifier to rebalance the floating DC outputs.

25. A dynamic grounding method comprising:
    monitoring the floating DC outputs of a power amplifier;
    detecting an imbalance in the floating DC outputs;
    generating a compensation signal in response to a detected imbalance; and
    adjusting the power amplifier to re-balance the floating DC outputs and suppress transients.

26. The dynamic grounding method of claim 25 in which monitoring includes sensing at least one of the current and voltage of said floating DC outputs.

27. The dynamic grounding method of claim 25 in which detecting includes comparing the sensed current/voltage to a reference to identify an imbalance error.

28. The dynamic grounding method of claim 25 in which generating a compensation signal includes generating a switching function to generate imbalance adjustment signals.

29. The dynamic grounding method of claim 25 in which adjusting the power amplifier includes applying the switching function to compensate for the imbalance in the floating DC outputs.

* * * * *